United States Patent
Maman et al.

(10) Patent No.: US 12,314,821 B2
(45) Date of Patent: May 27, 2025

(54) TECHNIQUES FOR ACTIVELY IDENTIFYING PARAMETERS OF COMPUTING INTERFACES BASED ON REQUESTS AND FOR ACTIVE TESTING USING SUCH PARAMETERS

(71) Applicant: Akamai Technologies, Inc., Cambridge, MA (US)

(72) Inventors: Netanel Maman, Mazkeret Batya (IL); Samuel Elgozi, Gan Yavne (IL); Tomer Semo, Tel Aviv-Jaffa (IL); Tomer Roizman, Tel Aviv-Jaffa (IL); Ofir Manzur, Tel Aviv-Jaffa (IL)

(73) Assignee: Akamai Technologies, Inc., Cambridge, MA (US)

( * ) Notice: Subject to any disclaimer, the term of this patent is extended or adjusted under 35 U.S.C. 154(b) by 186 days.

(21) Appl. No.: 17/661,821

(22) Filed: May 3, 2022

(65) Prior Publication Data
US 2023/0359924 A1    Nov. 9, 2023

(51) Int. Cl.
*G06F 21/00* (2013.01)
*G06F 9/54* (2006.01)
*G06F 21/57* (2013.01)
*G06N 20/00* (2019.01)

(52) U.S. Cl.
CPC ............ *G06N 20/00* (2019.01); *G06F 9/543* (2013.01); *G06F 21/577* (2013.01); *G06F 2221/034* (2013.01)

(58) Field of Classification Search
CPC ....... G06N 20/00; G06F 9/543; G06F 21/577; G06F 2221/034
See application file for complete search history.

(56) References Cited

U.S. PATENT DOCUMENTS

| | | | |
|---|---|---|---|
| 7,275,251 B2 | 9/2007 | Gitelson et al. | |
| 7,458,073 B1 | 11/2008 | Darling et al. | |
| 9,569,288 B2 | 2/2017 | Cui et al. | |
| 9,853,996 B2* | 12/2017 | Eliyahu | H04L 63/1441 |
| 10,437,712 B1* | 10/2019 | Tyler | G06F 11/3684 |
| 10,572,370 B2* | 2/2020 | Bahrami | G06F 11/3684 |
| 10,681,012 B2* | 6/2020 | Subbarayan | H04L 63/0876 |

(Continued)

FOREIGN PATENT DOCUMENTS

TW    201626218 A    7/2016

OTHER PUBLICATIONS

Hild III et al., "Feature Extraction Using Information-Theoretic Learning", IEEE Transactions on Pattern Analysis and Machine Intelligence, vol. 28, No. 9, Sep. 2006.*

*Primary Examiner* — Morshed Mehedi
(74) *Attorney, Agent, or Firm* — David H. Judson

(57) ABSTRACT

Systems and methods for active parameter identification. An example method includes applying a machine learning model to features extracted from each of at least one request to a computing interface, wherein the machine learning model is trained per value using a training set including a plurality of training values of a plurality of training requests, wherein the machine learning model is trained to output an indicator as to whether each portion of a request containing a respective value indicates a parameter when applied to the request; and identifying at least one parameter-indicating portion of each request to the computing interface based on outputs of the machine learning model.

19 Claims, 7 Drawing Sheets

(56) References Cited

U.S. PATENT DOCUMENTS

| | | |
|---|---|---|
| 10,922,083 B2 | 2/2021 | Balasubramanian et al. |
| 10,929,278 B2 | 2/2021 | Balasubramanian et al. |
| 10,990,516 B1 | 4/2021 | Merritt |
| 11,221,854 B2 | 1/2022 | Balasubramanian et al. |
| 2020/0233789 A1* | 7/2020 | Battaglia ............ G06F 11/3688 |
| 2021/0133089 A1 | 5/2021 | Khillar et al. |
| 2023/0283521 A1* | 9/2023 | Berger ................. H04L 63/20 709/223 |
| 2023/0315722 A1* | 10/2023 | Saxe ................. G06N 20/00 726/1 |
| 2023/0336581 A1* | 10/2023 | Dunn ................. G06F 21/577 |

* cited by examiner

TECHNIQUES FOR ACTIVELY IDENTIFYING PARAMETERS OF COMPUTING INTERFACES BASED ON REQUESTS AND FOR ACTIVE TESTING USING SUCH PARAMETERS

TECHNICAL FIELD

The present disclosure relates generally to computing interfaces, and more specifically to identifying potential cybersecurity vulnerabilities in computing interfaces.

BACKGROUND

The vast majority of cybersecurity breaches can be traced back to an issue with a computer interface such as an application programming interface (API). API abuses are expected to become the most frequent attack vector in the future, and insecure APIs have been identified as a significant threat to cloud computing.

An API is a computing interface. A computing interface is a shared boundary across which two or more separate components of a computer system exchange information. Computing interfaces therefore allow disparate computing components to effectively communicate with each other despite potential differences in communication format, content, and the like. An API defines interactions between software components.

In modern computing architectures, the backend acts like a direct proxy for data. As a result, a flawed API can lead to exposure of sensitive data, account takeovers, and even denial of service (DOS) attacks. As a result, securing APIs is a top priority of many computing services providers.

Cybersecurity solutions related to APIs face ongoing challenges about identifying misconfigurations of APIs and, more specifically, preemptively identifying potential vulnerabilities in APIs before the API is being exposed to external systems. Existing solutions could use data collected at runtime to detect unusual API behavior, but the rapid pace of cyberattacks can mean that even briefly exposing a potentially vulnerable API without first testing for vulnerabilities can result in significant damage. Detecting vulnerabilities earlier in development is vital to easing the burden of correcting issues and minimizing potential damage when computing interfaces are exposed to malicious entities.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for active parameter identification. The method comprises: applying a machine learning model to features extracted from each of at least one request to a computing interface, wherein the machine learning model is trained per value using a training set including a plurality of training values of a plurality of training requests, wherein the machine learning model is trained to output an indicator as to whether each portion of a request containing a respective value indicates a parameter when applied to the request; and identifying at least one parameter-indicating portion of each request to the computing interface based on outputs of the machine learning model.

Certain embodiments disclosed herein also include a non-transitory computer readable medium having stored thereon causing a processing circuitry to execute a process, the process comprising: applying a machine learning model to features extracted from each of at least one request to a computing interface, wherein the machine learning model is trained per value using a training set including a plurality of training values of a plurality of training requests, wherein the machine learning model is trained to output an indicator as to whether each portion of a request containing a respective value indicates a parameter when applied to the request; and identifying at least one parameter-indicating portion of each request to the computing interface based on outputs of the machine learning model.

Certain embodiments disclosed herein also include a system for active parameter identification. The system comprises: a processing circuitry; and a memory, the memory containing instructions that, when executed by the processing circuitry, configure the system to: apply a machine learning model to features extracted from each of at least one request to a computing interface, wherein the machine learning model is trained per value using a training set including a plurality of training values of a plurality of training requests, wherein the machine learning model is trained to output an indicator as to whether each portion of a request containing a respective value indicates a parameter when applied to the request; and identify at least one parameter-indicating portion of each request to the computing interface based on outputs of the machine learning model.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
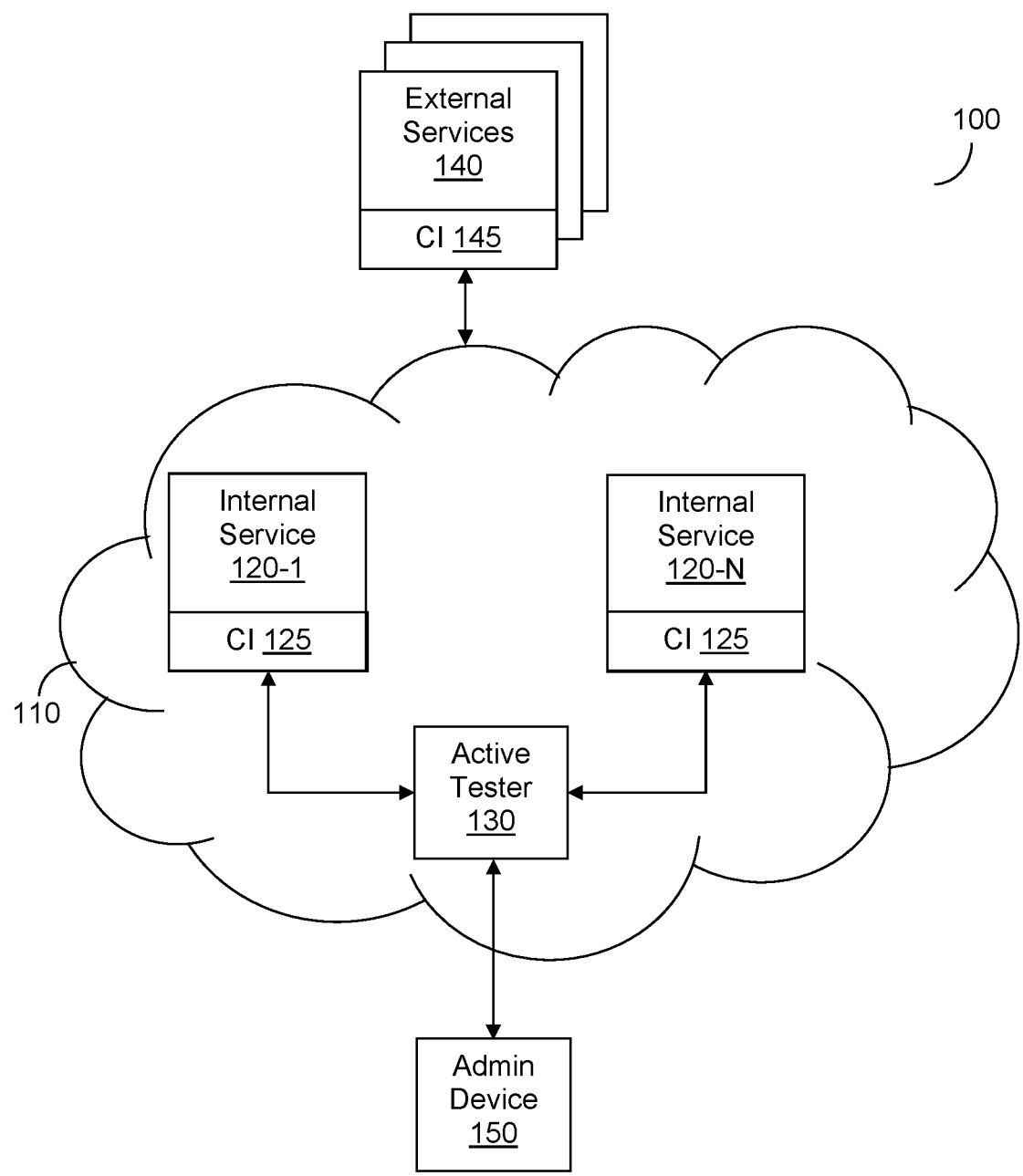
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In light of the challenges noted above, it has been identified that solutions for detecting vulnerabilities for computing interfaces are lacking when it comes to pre-production (PRE-PROD) during the continuous integration and continuous development (CI/CD) pipeline. It has further been identified that tools for understanding the computing interface model, establishing baseline behaviors of computing interfaces, and detecting unexpected or otherwise impermissible computing interface reactions to attempts to exploit those computing interfaces that can use data available before the computing interface communicates with external systems and programs will be needed to enable detection of computing interface vulnerabilities during PRE-PROD. To this end, the disclosed embodiments provide techniques for detecting vulnerabilities using various active testing methods which involve interacting with the computing interface and can be performed before the computing interface is exposed to external elements.

It is also noted that existing solutions for securing computing environments face challenges in testing computing interfaces at least because they lack sufficient data about the logic utilized by the computing interfaces. More specifically, it has been identified that successfully consuming a computing interface in order to perform testing requires properly formatting requests and inputting appropriate values into the request such that the computing interface will return a meaningful result (i.e., a result other than a null or fail result).

It has further been identified that resolving dependencies is relevant for such consumption for many computing interfaces. Some existing solutions utilize a known computing interface chart in order to track dependencies. However, those solutions cannot work unless the dependencies between computing interfaces are explicitly provided. Accordingly, various disclosed embodiments further include techniques for resolving dependencies between computing interfaces that enables actively testing the computing interfaces through attempts to consume the computing interface.

The disclosed embodiments provide techniques which can be utilized to test for vulnerabilities in computing interfaces such as APIs. More specifically, the disclosed techniques can be used to actively test for such vulnerabilities even if the computing interface is not currently running. Accordingly, the disclosed embodiments provide techniques suitable for use in detecting vulnerabilities in pre-production (PRE-PROD) environments. Thus, the disclosed embodiments allow for securing computing environments in which computing interfaces are deployed during the time between coding of the computing interfaces and exposure of those computing interfaces to external programs and systems.

To aid in testing computing interfaces, the disclosed embodiments provide new techniques for obtaining inputs, for analyzing inputs, and for running tests, each of which can be performed partially or entirely while the computing interface is offline (i.e., not exposed to any external programs or systems). The techniques for obtaining inputs allow for acquiring inputs needed for subsequent analysis and testing without requiring that the computing interface be online. The techniques for analyzing inputs allow for determine results expectations using inputs which may be obtained offline. The techniques for running tests provide various means of triggering requests, prompting unexpected responses from misconfigured interfaces, evaluating whether results are expected, and determining applicable tests.

In accordance with various disclosed embodiments, techniques for identifying parameter-indicating portions of requests to a computing interface are provided. These techniques allow for identifying portions of requests formatted for a given computing interface representing parameters. This identification of parameter-indicating portions allows for creating a specification defining proper formatting of requests for the computing interface, generating a properly formatted request to the computing interface, or both. The specification, request, or both, may be utilized for dependency resolution and testing of the computing interface. For generating requests, identifying which portions of the request indicate the presence of parameters aids in determining values to be included in a new request, thereby allowing for effectively testing the computing interface.

In this regard, it is noted that the format of requests to a computing interface is not always known, and that sending requests which are improperly formatted as part of testing the computing interface will fail to provide meaningful results (e.g., only null or fail results may occur regardless of the test performed). In particular, proper formatting of requests to a given computing interface may be defined in a specification, but the specification for any given computing interface may not exist or may otherwise be unavailable. Accordingly, the disclosed embodiments provide techniques for obtaining data needed for performing certain tests of computing interface even when the specification of the computing interface is unavailable or lacking definitions of proper request formats.

FIG. 1 shows an example network diagram 100 utilized to describe the various disclosed embodiments. In the example network diagram 100, internal services 120-1 through 120-N (which may be referred to individually as an internal service 120 or collectively as internal services 120) communicate with each other and/or with one or more external services 140 (which may be referred to individually as an external service 130 or collectively as external services 130). The internal services 120 are services hosted on a network 110. Each of the internal services 120 communicates at least using a respective communications interface (CI) 125 and each of the external services 140 communicates at least using a respective communications interface (CI) 145. The communication interfaces 125 and 145 may be, but are not limited to, Application Programming Interfaces (APIs).

The network 110 may be, but is not limited to, a wireless, cellular or wired network, a local area network (LAN), a wide area network (WAN), a metro area network (MAN), the Internet, the worldwide web (WWW), similar networks, and any combination thereof. The network 110 may be operated by an organization (e.g., by including servers owned by the organization), or may be operated by another entity (e.g., a cloud provider or other provider of network computing services). It should be noted that a single network 110 is depicted merely for simplicity purposes, but that the internal services 120 may communicate via multiple networks and/or other connections in accordance with the disclosed embodiments.

The active tester 130 is configured to perform active testing of computing interfaces such as the computing interfaces 125 in accordance with various embodiments described herein. The active testing is performed in order to detect vulnerabilities present in the computing interfaces 125, and may be utilized to detect such vulnerabilities even when the internal services 120 are not running, i.e., outside of runtime, in addition to or instead of testing during runtime. This may allow, for example, detecting vulnerabilities before the internal services 120 are exposed to the external services 140. A process including active testing which may be performed by the active tester 130 is described below with respect to FIG. 2.

To support the active testing, the active tester 130 is configured to identify parameters of computing interfaces. The parameters of the computing interfaces 125 may be identified based on specifications (not shown) of those computing interfaces or by actively identifying such parameters based on requests for the computing interfaces. To this end, in some embodiments, the active tester 130 may have installed thereon an active engine (not shown), which includes or is otherwise configured to executed instructions for performing such active identification, for example as described below with respect to FIG. 4.

In accordance with various disclosed embodiments and in further support of the active testing, the active tester 130 is further configured to resolve dependencies of computing interfaces. In some embodiments, the process used for resolving dependencies for a given computing interface 125 depends on the availability of a specification for the computing interface 125. An example process for resolving dependencies using a specification of a computing interface is described in more detail below with respect to FIG. 3. An example process for resolving dependencies which may be performed without using a specification of a computing interface is described in more detail below with respect to FIG. 5.

Based on the resolved dependencies, the active tester 130 is configured to run one or more tests on each computing interface 125 being tested. More specifically, the tests include active tests performed by sending requests to the computing interface. The information included in the requests is determined at least using the resolved dependencies. Which tests to be performed on a given computing interface, as well as the criteria for detecting vulnerabilities, depends on the type of vulnerability being tested for (e.g., broken object level authentication, also known as BOLA). A non-limiting example process for a BOLA test which demonstrates testing for a specific vulnerability is described further below with respect to FIG. 6.

In some embodiments, the active tester 130 may send notifications about testing results to an administrator (admin) device 150. The admin device 150 may be, but is not limited to, a personal computer, a laptop, a tablet computer, a smartphone, a wearable computing device, or any other device capable of receiving and displaying notifications or a graphical user interface including anomaly detection data and/or supplemental data. The admin device 150 may be, but is not limited to, operated by an administrator of the network 110 or other user who may want information regarding computing interfaces used within the network (e.g., the computing interfaces 125) and, in particular, vulnerabilities of such computing interfaces. In another implementation (not shown in any of FIGS. 1A-C), the active tester 130 may be configured to send such data to a cybersecurity tool configured to perform mitigation actions with respect to the internal services 120 and/or the external service 140.

It should be noted that the particular network configuration shown in FIG. 1 is merely utilized to illustrate an example deployment of the active tester 130, and that the disclosed embodiments may be applied to other network configurations without departing from the scope of the disclosure. As some particular examples, different numbers of internal services 120 may communicate within the network 110, and the active tester 130 may be configured to detect vulnerabilities in any or all of them. In some implementations, multiple anomaly detectors may be utilized. Additionally, the active tester 130 may be implemented as a system (e.g., a server), as a virtual machine, as a software container or other self-contained software package, and the like.

Figure 2:
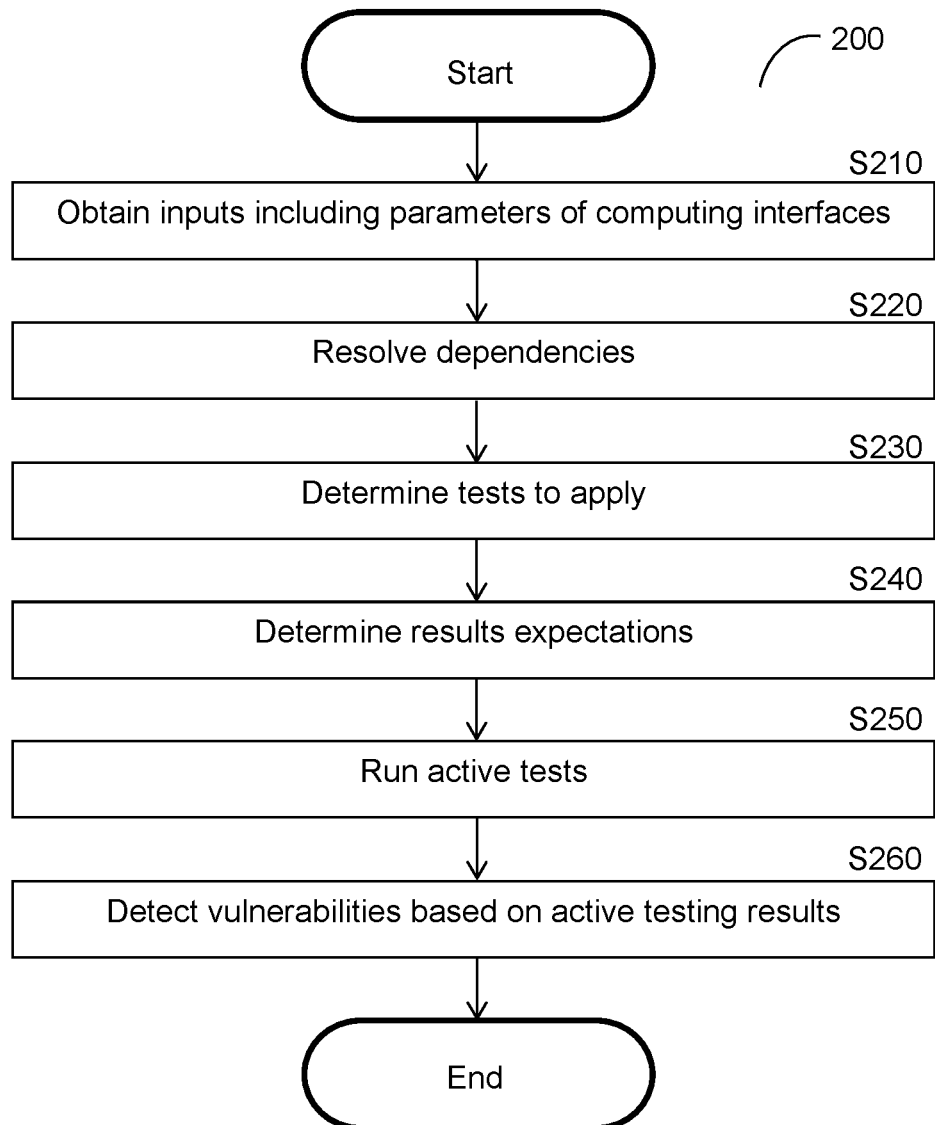
FIG. 2 is a flowchart illustrating a method for active testing of computing interfaces according to an embodiment.

FIG. 2 is an example flowchart 200 illustrating a method for active testing of computing interfaces according to an embodiment. In an embodiment, the method is performed by the active tester 130, FIG. 1.

At S210, inputs to be used for testing a computing interface are obtained. The inputs may be obtained using an existing specification of the computing interface, may be obtained by actively identifying parameters in requests of the computing interface, or both.

The existing specification may be a predetermined specification and may be provided, for example, by the creator of the computing interface or by an entity operating the environment in which the computing interface is deployed. The specification of a computing interface is or includes data detailing the functional and expected behavior of the computing interface, and may further include supplemental data describing the design philosophy of the computing interface or supported data types. The specification therefore provides information to be utilized in order to standardize data exchanges between different computing interfaces. The specification may be realized in the form of, for example, text. This text may be analyzed to identify parameters used by the computing interface, which in turn may be utilized as inputs for subsequent processing.

When the specification is unavailable, S210 may include applying an active engine configured to actively identify parameters to be used as inputs for testing of the computing interface. An example process for actively identifying parameters to be used as inputs is described further below with respect to FIG. 4.

At S220, dependencies are resolved between computing interfaces. More specifically, the dependencies are resolved such that connections between the computing interface to be tested and other computing interfaces can be identified and mapped. Further connections between computing interfaces linked to the computing interface being tested may also be identified via this dependency resolution.

Figure 3:
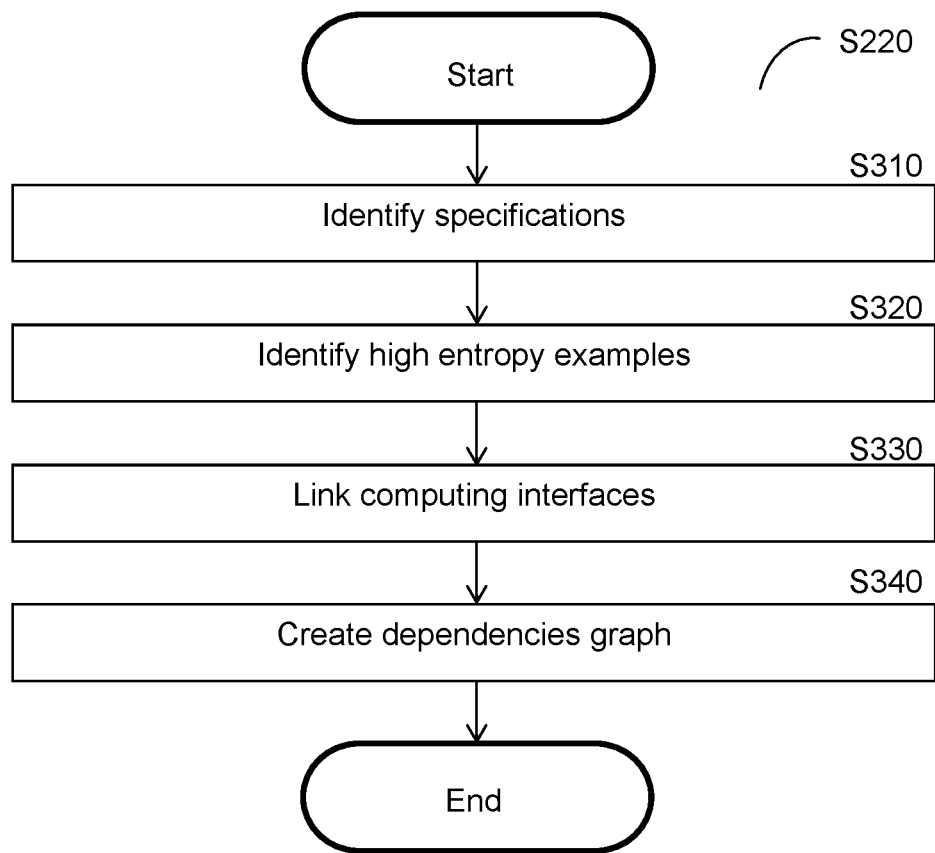
FIG. 3 is a flowchart illustrating a method for dependency resolution using a specification of a computing interface according to an embodiment.

In some embodiments, at least part of the process used for dependency resolution may differ depending on whether specifications are available for every computing interface analyzed during dependency resolution. An example process for resolving dependencies using specifications of computing interfaces is described with respect to FIG. 3. FIG. 3 is an example flowchart S220 illustrating a method for dependency resolution using a specification of a computing interface according to an embodiment.

At S310, specifications to be analyzed for dependencies are obtained or identified. The specification for each computing interface may be predetermined, or may be created based on traffic sent to and from the computing interface during initial testing. To this end, S310 may include actively creating a specification for the computing interface. An example process for actively creating a specification is described below with respect to FIG. 5.

At S320, high entropy examples are identified.

In an embodiment where a specification to be analyzed is provided (for example, by a developer of the computing interface), the specification may come with one or more examples of request values that may be used to consume the computing interface. In such an embodiment, S320 may include analyzing the examples of the specification in order to identify one or more high entropy examples among the specification. In a further embodiment, the high entropy examples are examples among the specification having an entropy above a threshold. As a non-limiting example, the entropy of a value that is a string may be determined based on factors such as, but not limited to, length of the string, probability of occurrence of each character in the string, and the like.

Figure 4:
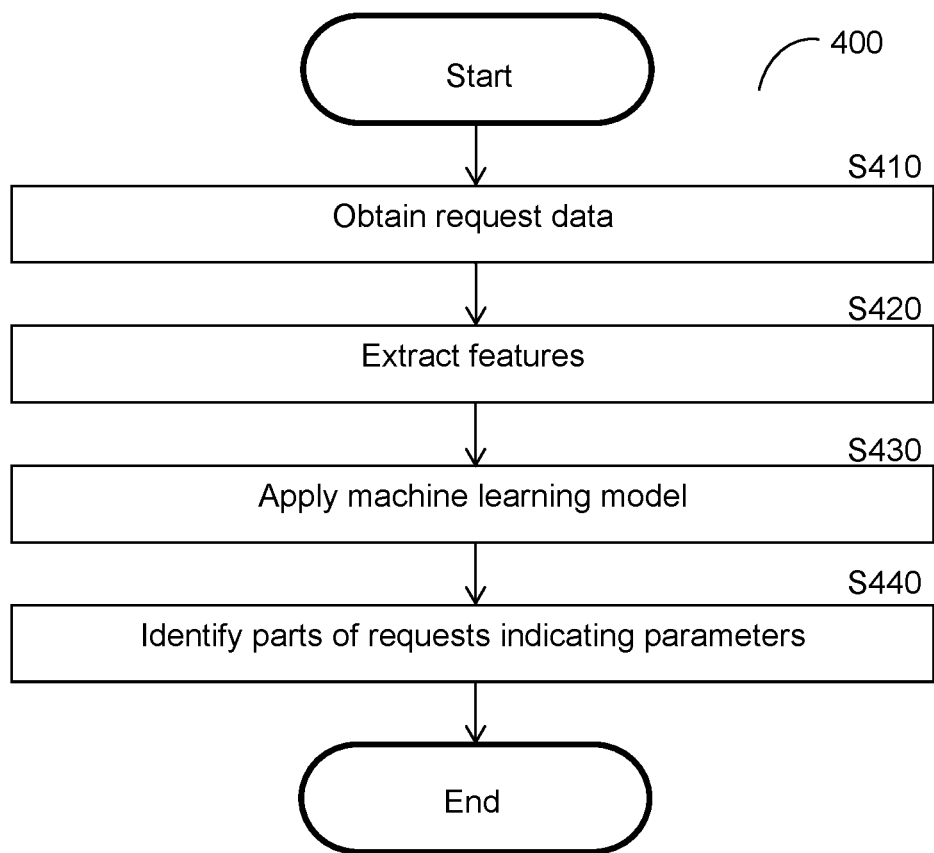
FIG. 4 is a flowchart illustrating a method for actively identifying parameters of a computing interface based on requests of the computing interface according to an embodiment.

In another embodiment where a specification to be analyzed is not provided (e.g., where the relevant information from the specification is obtained through analysis via an active engine, for example as described with respect to FIG. 4), the high entropy examples may be identified in traffic to the computing interface.

To this end, in such an embodiment, S320 further includes determining entropy values of samples included in the traffic. The entropy values may be determined for each sample relative to other samples included in requests of the same type (i.e., samples included in the same type of request as the given sample). More specifically, an entropy value may be determined for each part of each request among a set of traffic samples. Alternatively or in combination, the entropy values may be determined using another method of measuring the variance or known span of values for a given part of a request as would be known to a person having ordinary skill in the art. In various embodiments, only samples having entropy values above a threshold may be identified as high entropy examples. The entropy values may be determined using, for example but not limited to, a probabilistic model or machine learning model such as a model incorporated in the active engine.

In a further embodiment, the high entropy examples identified based on traffic may only include examples for which the determined entropy is high (e.g., the entropy value is above a threshold) and multiple instances of the example occurs in the traffic. In yet a further embodiment, only examples having numbers of instances at or above a threshold are included as high entropy examples. Examples determined to be high entropy may be added to a specification created for the computing interface and identified at S320, for example as described with respect to FIG. 5.

At S330, computing interfaces are linked such that each computing interface is linked to any computing interfaces it depends from. Accordingly, the links represent dependencies between the computing interfaces.

In an embodiment where a specification of a computing interface including examples is provided (for example, by a developer of the computing interface), the computing interface may be linked to other computing interfaces based on identification of common examples between respective specifications of the computing interfaces. In other words, the computing interface is linked to any other computing interfaces sharing one or more examples that each match a respective high entropy example of the computing interface. As a non-limiting example, when a specification of a computing interface includes an example "123456," the computing interface may be linked to other computing interfaces having respective specifications including "123456" as an example. In this regard, it is noted that developers frequently use the same example across specifications of computing interfaces which depend from each other such that the presence of the same example indicates a high likelihood that there is a dependency between the computing interfaces.

In another embodiment where a specification of a computing interface to be analyzed is not provided (e.g., where the relevant information from the specification is obtained through analysis via an active engine, for example as described with respect to FIG. 4), the computing interface may be linked to other computing interfaces based on traffic involving the high entropy examples. To this end, requests including the high entropy examples may be sent to the computing interface and the resulting calls to other computing interfaces may be observed in order to identify instances of other computing interfaces being called using a high entropy example of the computing interface. Based on each call of one computing interface by another, the calling computing interface is linked to the computing interface it calls.

At S340, a dependencies graph is created based on the linked computing interfaces. The dependencies graph defines dependencies between the computing interfaces, and may therefore be utilized to determine results expectations for tests performed on any one of the computing interfaces. To this end, the dependencies graph may be realized as, for example but not limited to, nodes representing computing interfaces and edges representing links or dependencies between computing interfaces.

A computing interface may depend on another computing interface directly or indirectly. A direct dependency may be realized as a call from one interface to another (i.e., the specification for one interface includes a call to the other interface). An indirect dependency may be realized as a call to one or more intermediary interfaces which, when performed, ultimately results in calling the interface upon which another interface indirectly depends. Creating a dependencies graph mapping direct dependencies between computing interfaces allows for identifying indirect dependencies between computing interfaces. This, in turn, allows for unearthing new expected or forbidden results, which in turn reduces the numbers of false positives and/or false negatives in vulnerability testing based on such resolved dependencies.

As a non-limiting example of computing interface dependencies, a specification of a first interface may include a call to a second interface, and a specification of the second interface may include a call to a third interface. In such an example, the first interface has a direct dependency on the second interface, the second interface has a direct dependency on the third interface, and the first interface has an indirect dependency on the third interface.

Returning to FIG. 2, at S230, one or more tests to be applied for the computing interface are determined. The tests include one or more active tests which utilize inputs that can be obtained without requiring the computing interface to communicate with external programs or systems outside of a network or other computing environment in which the computing interface is deployed.

In an embodiment, the tests to be applied are determined based on user selections. As a non-limiting example, a user may tag each computing interface to be tested with one or more tags representing the tests to be applied to the computing interface. As a non-limiting example, for a computing interface having "BOLA" and "BFLA" tags, the tests to be applied are determined to include tests for BOLA vulnerabilities and BFLA vulnerabilities. As another non-limiting example, for an API having an "authentication" tag indicating that the API requires authentication, a test involving an attempt to consume the API anonymously may be determined as the test to be applied.

In another embodiment or when user selections are unavailable (e.g., when a computing interface has no tags of desired tests to be performed), the tests to be performed may include all tests which can be performed using the available inputs, a random sampling of tests which can be performed using the available inputs, a predetermined selection of tests, and the like.

At S240, based on the resolved dependencies and the tests to be applied, one or more results expectations is determined. The results expectations may include, but are not limited to, expected results (i.e., results which are expected to occur), forbidden results (i.e., results which should not occur and are expected not to occur), or both.

The results expectations may be predetermined and may be defined in results expectation rules for different tests, for different tags, both, and the like. As a non-limiting example, when a test to be applied for the computing interface is a test to confirm that the computing interface authenticates including sending an anonymous request, results expectation rules for an "authentication" tag may define an expected result as a fail result. As another non-limiting example, the expected results for a BOLA test (e.g., as described below with respect to FIG. 6) may be to receive different results for requests having secrets of different users or, alternatively, the forbidden result may be to receive the same result for the requests of different users.

At S250, the determined active tests are run with respect to the results expectations. In an embodiment, S250 at least includes one or more attempts to consume the computing interface performed by sending requests to the interface formatted in accordance with the specification of the computing interface and including values which are expected to return results other than null or fail results. By actively sending requests to the computing interface in this manner, the computing interface is actively tested for vulnerabilities.

At S260, one or more vulnerabilities are detected based on the results of the active tests. The vulnerabilities may be detected based on, for example, the absence of an expected result or the presence of a forbidden result. In an embodiment, S260 may include performing one or more mitigation actions with respect to the detected vulnerabilities. Such mitigation actions may include, but are not limited to, generating a notification indicating the vulnerability and/or the vulnerable computing interfaces, blocking the vulnerable computing interfaces, and the like.

FIG. 4 is a flowchart 400 illustrating a method for actively identifying parameters of a computing interface based on requests of the computing interface according to an embodiment. In an embodiment, the method is performed by the active tester 130, FIG. 1.

At S410, request data for a computing interface is obtained. The request data at least includes one or more requests sent to the computing interface, for example requests provided by a user.

At S420, features are extracted from the request data. The extracted features may include, but are not limited to, values included in requests. The values may be, but are not limited to, numerical values, strings, and the like. Values may be identified as numbers or strings between slash marks, and may be extracted so as to exclude known functions (e.g., "GET," "POST," "DELETE," etc., may be known not to be values and therefore not extracted as values).

At S430, a machine learning model is applied to the features extracted from the request data. In an embodiment, the machine learning model is trained per value included in requests using known computing interface specifications. The model may therefore be trained to classify each portion of a request including a specific value as either indicating or not indicating a parameter. Using a model trained based on values allows for determining whether a given value (and therefore the portion of the request including that value) likely represents a parameter without requiring a large sample size of requests including the value.

At S440, based on the output of the machine learning model, portions of the requests indicating parameters are identified. When the output of the machine learning includes classifications of portions as either parameters or not parameters, the identified portions include those classified as parameters. Optionally, when the output of the machine learning model further includes confidence scores indicating a likelihood that the classification is correct, only portions of requests classified as parameters having confidence scores above a threshold are identified as portions indicating parameters.

Identifying parameters indicated in requests in the manner described above allows for actively identifying such parameters when a specification of the computing is unavailable. In this regard, it is noted that such specifications may not always be readily available. Specifications can be analyzed in order to identify parameters for computing interfaces, which in turn can be used to determine dependencies of the computing interfaces. However, when such specifications are unavailable, the active engine may be utilized in order to identify these parameters in request data, thereby allowing for dependency resolution.

It has further been identified that statistical testing is most likely insufficient when the computing interface is not yet online, e.g., during PRE-PROD. When actively testing the computing interface before it connects to external systems, the amount of data available may be small (e.g., only 1-2 requests). The techniques described with respect to FIG. 4 may be utilized in order to identify parameters for the computing interface without requiring statistical testing, thereby allowing for effectively identifying these parameters without a specification during PRE-PROD or otherwise without requiring the computing interface to be online and receiving requests from external systems.

Figure 5:
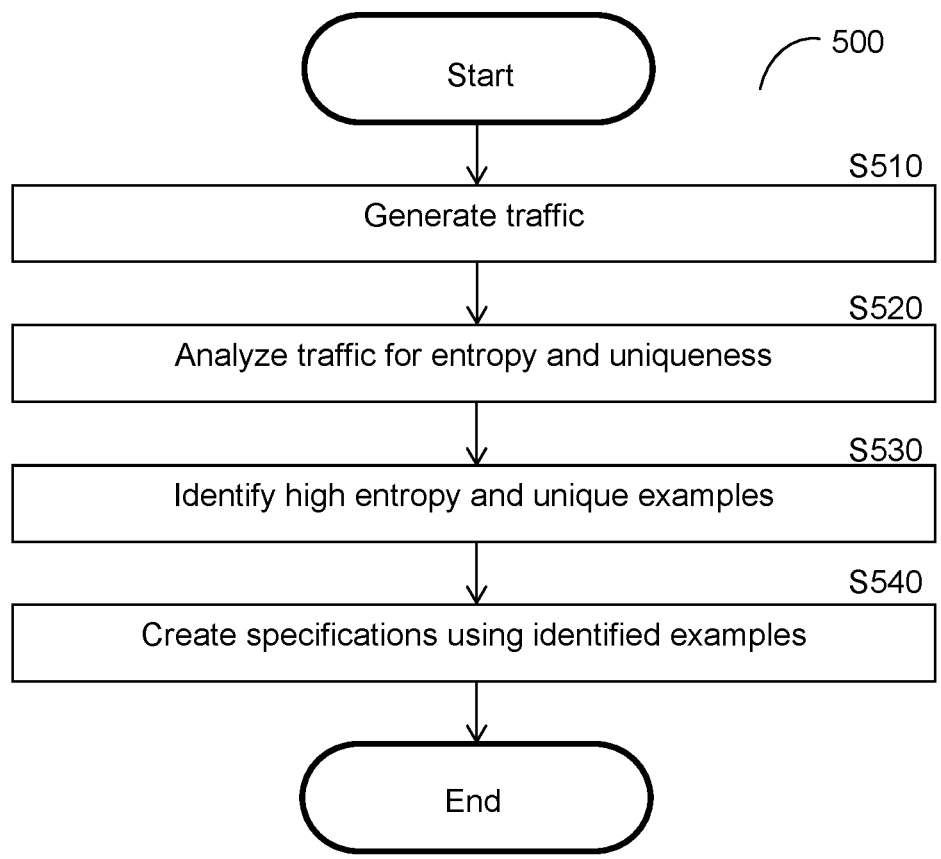
FIG. 5 is a flowchart illustrating a method for active creation of a computing interface specification according to an embodiment.

FIG. 5 is an example flowchart 500 illustrating a method for active creation of a computing interface specification according to an embodiment according to an embodiment. In an embodiment, the method is performed by the active tester 130, FIG. 1.

The process shown in FIG. 5 may be utilized, for example, when a specification is unavailable for a given computing interface. As a non-limiting example, the method of FIG. 5 may be utilized at S310, FIG. 3, in order to obtain one or more computing interface specifications to be used for dependency resolution. Accordingly, this method may be used in tandem with the active engine and/or active identification described above in order to allow for resolving dependencies of computing interfaces without requiring access to the specifications of those computing interfaces.

At S510, traffic to the computing interface is obtained. The traffic includes one or more requests sent to the computing interface, for example requests provided by a user.

At S520, the traffic is analyzed for both entropy and uniqueness. The analysis may include statistical analysis of the traffic for these properties.

At S530, examples within the traffic that are both high entropy and unique are identified. In an embodiment, each example having an entropy value above a threshold is determined as high entropy and each example having a uniqueness value above a threshold is determined as highly unique.

At S540, specifications are created using the identified high entropy and unique samples. The created specifications define formats for requests determined based on the high entropy and unique examples, and may further include the high entropy and unique examples as examples for requests in those formats. The high entropy and unique examples may be used in order to link computing interfaces as described above with respect to S330, FIG. 3, for example by identifying high entropy and unique examples that occur multiple times within traffic.

Figure 6:
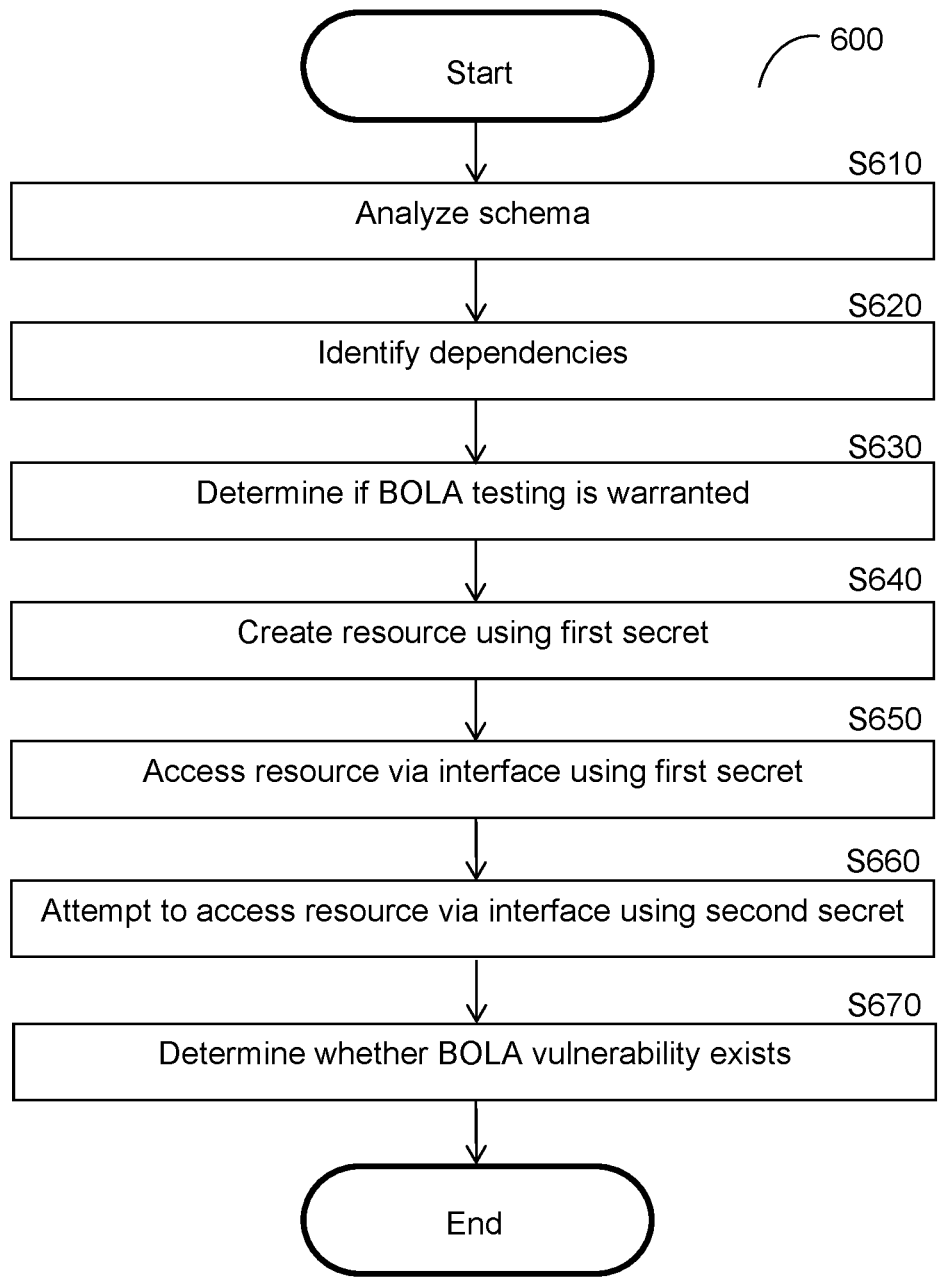
FIG. 6 is a flowchart illustrating a method for performing active testing according to an embodiment.

FIG. 6 is an example flowchart 600 illustrating a method for performing active testing according to an embodiment. In an embodiment, the method is performed by the active tester 130, FIG. 1.

The non-limiting example test discussed with respect to FIG. 6 can be utilized to detect broken object level authentication (BOLA) vulnerabilities. It is noted that, during a BOLA attack, an error occurs in deployment of the API which makes it possible for one user to consume a resource created using another user's secret without proper authentication (i.e., without having the secret used to originally create the resource). As a non-limiting example, a BOLA vulnerability may exist with respect to a computing interface used for a social media platform when a first user can access a second user's social media account with the first user's authentication credentials. Thus, it has been identified that BOLA vulnerabilities can be actively tested for by sending a request to a computing interface including a first secret in order to create a resource and then attempting to consume the computing interface in order to access the resource using the second secret. The fact that the second secret can be used to successfully access the resource via the computing interface can be confirmed by also consuming the computing interface using the first resource and then comparing the results of consuming the computing interface using the first and second secrets.

At S610, a schema of a computing interface is analyzed. The schema may be a schema indicated in or otherwise defined by a specification of the computing interface, e.g., either a known specification or a specification created as described above with respect to FIG. 5. To this end, S610 may include analyzing at least a portion of the specification of the computing interface.

At S620, dependencies of the computing interface are identified. In an embodiment, the identified dependencies may be or may include the dependencies resolved as discussed above. To this end, in some implementations, S620 may further include accessing a dependencies graph in order to identify the dependencies based on connections to a node representing the computing interface in the dependencies graph.

At optional S630, based on the schema analysis, the dependency identification, or both, it may be determined whether BOLA testing is required.

In an embodiment, based on the schema analysis, it is determined whether the computing interface contains an input parameter of a resource identifier that may be retrieved, for example, via a computing interface dependency (i.e., via another computing interface called by this computing interface). If such an input parameter is not included in the computing interface, then the computing interface is not a candidate for BOLA testing and execution may terminate. In some embodiments, if no dependencies are identified, then the interface may be determined not to be a candidate for BOLA testing and execution may terminate (i.e., no BOLA test is performed).

As a non-limiting example, when a header of the computing interface is "GET/users/{userID}/articles/{articleID}", it is determined that the computing interface has at least two dependencies: "userID" and "articleID." The dependencies are further indicated by an input parameter of a resource identifier. Accordingly, it is determined that the computing interface requires BOLA testing and execution proceeds to S640.

At S640, a resource is created using a first secret of a first user. In an embodiment, the first user is a user identified in a predetermined user profile having multiple users, where each user has a corresponding secret. To this end, S640 may include generating a request to create a resource including the first user's secret formatted at least partially based on the dependencies of the computing interface, and sending the generated request to the computing interface, thereby creating the resource using the first user's secret. In a further embodiment, creating the resource involves consuming each dependency of the computing interface.

At S650, the computing interface is consumed using the secret of the first user by sending a request for the created resource embedded with the secret of the first user. The computing interface responds by providing the requested resource.

At S660, a request for the created resource embedded with a second secret of a second user among the users of the user profile is sent to the computing interface, thereby attempting to access the resource of the first user by using the secret of the second user. In an embodiment, S660 includes generating a request to the computing interface including the second user's secret based on the dependencies of the computing interface, thereby attempting to consume the resource using the second user's secret.

At S670, based on the response to the request for the resource embedded with the second user's secret, it is determined whether a BOLA vulnerability exists.

In an embodiment, no BOLA vulnerability is detected when the response is a null or fail result. As a non-limiting example, when the server responds with a notification indicating "Access Denied" (401/403) or "Resource Not Found" (404), then it is determined that no BOLA vulnerability exists.

In another embodiment, when the response to the request includes a result other than a null or fail result, the response obtained using the second user's secret sent at S660 is compared to the response obtained using the first user's secret sent at S650. If the responses are different (i.e., do not match), than it is determined that no BOLA vulnerability exists. If the responses match (i.e., a request using the first secret returns the same resource as the request using the second secret), then a BOLA vulnerability is detected for the computing interface.

As a non-limiting example, a multi-user profile containing secret "aaaaaa" of a first user and secret "bbbbbb" of a second user in order to test an API. A schema of the API indicates that requests to the API include a request formatted as follows:

GET /order/{order-id}

Based on dependencies for the computing interface, it is determined that "order-id" depends on a function called via a "POST" request. To this end, a resource "order-id" is created and the computing interface is consumed using the first user's secret by embedding "aaaaaa" in the following requests:

POST /order→order-id=5
GET /order/5

Additionally, the computing interface is consumed using the second user's secret by embedding "bbbbbb" in the following request:

GET /order/5

If the result returned for the "GET" request embedded with secret "bbbbbb" is a null or fail result, then it is determined that no BOLA vulnerability exists. If a resource is returned for the "GET" request embedded with secret "bbbbbb", then the response for that request is compared to the response for the "GET" request embedded with secret "aaaaaa." If the responses match, then a BOLA vulnerability is detected; otherwise, no BOLA vulnerability is detected.

It should be noted that FIG. 6 illustrates an example test for a specific type of vulnerability (BOLA), but that the disclosed embodiments are not limited to the particular testing process shown and described with respect to FIG. 6. Other tests performed based on the identified parameters, resolved dependencies, or both, may be equally utilized without departing from the scope of the disclosure.

Figure 7:
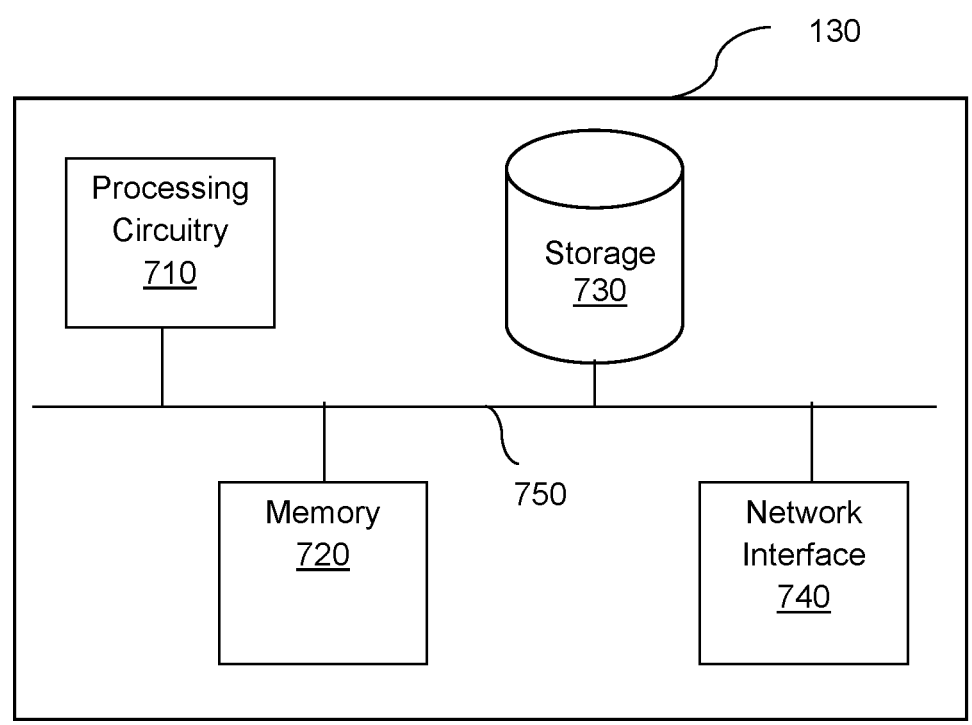
FIG. 7 is a schematic diagram of an active tester according to an embodiment.

FIG. 7 is an example schematic diagram of an active tester 130 according to an embodiment. The active tester 130 includes a processing circuitry 710 coupled to a memory 720, a storage 730, and a network interface 740. In an embodiment, the components of the active tester 130 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the active tester 130 to communicate with, for example, the internal services 120, the admin device 150, or both.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for active parameter identification, comprising:
applying a machine learning model to features extracted from each of at least one request to a computing interface, wherein the machine learning model is trained per value using a training set including a plurality of training values of a plurality of training requests, wherein the machine learning model is trained to output an indicator as to whether each portion of a request containing a respective value indicates a parameter when applied to the request; and
identifying at least one parameter-indicating portion of each request to the computing interface based on outputs of the machine learning model.

2. The method of claim 1, further comprising:
creating a specification for the computing interface based on the identified at least one parameter-indicating portion of each request to the computing interface.

3. The method of claim 2, wherein each of the at least one request to the computing interface is an example request having an entropy above a threshold.

4. The method of claim 3, wherein multiple instances of each of the at least one request to the computing interface is included in traffic to the computing interface.

5. The method of claim 2, further comprising:
detecting at least one vulnerability of the computing interface using the specification created for the computing interface.

6. The method of claim 5, wherein the at least one request to the computing interface is at least one first request, wherein detecting the at least one vulnerability further comprises:
consuming the computing interface by sending at least one second request based on the identified at least one parameter-indicating portion of each first request to the computing interface.

7. The method of claim 6, further comprising:
determining at least one value to be included in the at least one second request such that each of the at least one value corresponds to one of the at least one parameter-indicating portion of one of the at least one first request to the computing interface.

8. The method of claim 7, wherein the at least one value is determined based on at least one dependency of the computing interface.

9. The method of claim 1, wherein the computing interface is an application programming interface.

10. A non-transitory computer readable medium having stored thereon instructions for causing a processing circuitry to execute a process, the process comprising:
applying a machine learning model to features extracted from each of at least one request to a computing interface, wherein the machine learning model is trained per value using a training set including a plurality of training values of a plurality of training requests, wherein the machine learning model is trained to output an indicator as to whether each portion of a request containing a respective value indicates a parameter when applied to the request; and
identifying at least one parameter-indicating portion of each request to the computing interface based on outputs of the machine learning model.

11. A system for active parameter identification, comprising:
a processing circuitry; and
a memory, the memory containing instructions that, when executed by the processing circuitry, configure the system to:
apply a machine learning model to features extracted from each of at least one request to a computing interface, wherein the machine learning model is trained per value using a training set including a plurality of training values of a plurality of training requests, wherein the machine learning model is trained to output an indicator as to whether each portion of a request containing a respective value indicates a parameter when applied to the request; and
identify at least one parameter-indicating portion of each request to the computing interface based on outputs of the machine learning model.

12. The system of claim 11, wherein the system is further configured to:
create a specification for the computing interface based on the identified at least one parameter-indicating portion of each request to the computing interface.

13. The system of claim 12, wherein each of the at least one request to the computing interface is an example request having an entropy above a threshold.

14. The system of claim 13, wherein multiple instances of each of the at least one request to the computing interface is included in traffic to the computing interface.

15. The system of claim 12, wherein the system is further configured to:
detect at least one vulnerability of the computing interface using the specification created for the computing interface.

16. The system of claim 15, wherein the at least one request to the computing interface is at least one first request, wherein the system is further configured to:
consume the computing interface by sending at least one second request based on the identified at least one parameter-indicating portion of each first request to the computing interface.

17. The system of claim 16, wherein the system is further configured to:
determine at least one value to be included in the at least one second request such that each of the at least one value corresponds to one of the at least one parameter-indicating portion of one of the at least one first request to the computing interface.

18. The system of claim 17, wherein the at least one value is determined based on at least one dependency of the computing interface.

19. The system of claim 11, wherein the computing interface is an application programming interface.

* * * * *